(12) United States Patent  
Harrod et al.

(10) Patent No.: US 8,219,249 B2
(45) Date of Patent: Jul. 10, 2012

(54) INDOOR AIR QUALITY CONTROLLERS AND USER INTERFACES

(75) Inventors: Gregory Ralph Harrod, Wichita, KS (US); Bradley A. Beers, Dorr, MI (US); Grant E. Carmichael, Grand Rapids, MI (US); Jedidiah O. Bentz, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 311 days.

(21) Appl. No.: 12/560,256

(22) Filed: Sep. 15, 2009

(65) Prior Publication Data

US 2010/0070086 A1 Mar. 18, 2010

Related U.S. Application Data

(60) Provisional application No. 61/097,133, filed on Sep. 15, 2008.

(51) Int. Cl.
| | |
|---|---|
| *F25D 21/00* | (2006.01) |
| *F25D 21/06* | (2006.01) |
| *G05B 13/02* | (2006.01) |
| *G05B 21/00* | (2006.01) |
| *G05B 13/00* | (2006.01) |
| *G05B 15/00* | (2006.01) |
| *G05B 23/00* | (2006.01) |
| *G01M 1/28* | (2006.01) |

(52) U.S. Cl. ............ 700/276; 700/44; 700/54; 700/299; 62/150; 62/151; 62/155; 62/234

(58) Field of Classification Search .................. 700/276, 700/44, 54, 299; 62/150, 151, 155, 234
See application file for complete search history.

(56) References Cited

U.S. PATENT DOCUMENTS

| | | | | |
|---|---|---|---|---|
| 4,178,988 | A | * | 12/1979 | Cann et al. .................. 165/242 |
| 4,563,877 | A | * | 1/1986 | Harnish .......................... 62/80 |
| 5,305,953 | A | | 4/1994 | Rayburn et al. |
| 5,402,845 | A | | 4/1995 | Jeffery et al. |
| 5,417,077 | A | | 5/1995 | Jeffery et al. |
| 5,417,368 | A | | 5/1995 | Jeffery et al. |
| 6,070,110 | A | | 5/2000 | Shah et al. |
| 6,098,893 | A | * | 8/2000 | Berglund et al. ............... 236/51 |
| 6,155,341 | A | | 12/2000 | Thompson et al. |
| 6,449,533 | B1 | | 9/2002 | Mueller et al. |
| 6,619,555 | B2 | * | 9/2003 | Rosen ........................ 236/46 R |
| 6,621,507 | B1 | | 9/2003 | Shah |
| 6,691,526 | B2 | * | 2/2004 | Gether et al. ................ 62/238.7 |
| 6,824,069 | B2 | | 11/2004 | Rosen |
| 6,994,620 | B2 | | 2/2006 | Mills |
| 7,000,849 | B2 | | 2/2006 | Ashworth et al. |

(Continued)

FOREIGN PATENT DOCUMENTS

GB 2139783 * 11/1984

(Continued)

*Primary Examiner* — Ronald Hartman, Jr.
(74) *Attorney, Agent, or Firm* — Fletcher Yoder

(57) ABSTRACT

Controllers for controlling heating, ventilating, air conditioning, and cooling (HVAC) systems are provided. The controllers include graphical user interfaces for user adjustment of system settings. The controllers also include communication interfaces for receiving climate data. In certain embodiments, the controllers govern operation of the HVAC systems based at least in part on the climate data. Further, the controllers may display information and alerts related to the climate data. The controllers also may govern operation of air treatment devices within the HVAC systems.

24 Claims, 12 Drawing Sheets

U.S. PATENT DOCUMENTS

| | | |
|---|---|---|
| 7,017,827 B2 | 3/2006 | Shah et al. |
| 7,114,554 B2 | 10/2006 | Bergman et al. |
| 7,152,806 B1 | 12/2006 | Rosen |
| 7,156,316 B2 | 1/2007 | Kates |
| 7,188,002 B2 | 3/2007 | Chapman, Jr. et al. |
| 7,212,887 B2 | 5/2007 | Shah et al |
| 7,222,494 B2 | 5/2007 | Peterson et al. |
| 7,225,054 B2 | 5/2007 | Amundson et al. |
| 7,243,004 B2 | 7/2007 | Shah et al. |
| 7,287,709 B2 | 10/2007 | Proffitt et al. |
| 7,308,384 B2 | 12/2007 | Shah et al. |
| 7,364,353 B2 | 4/2008 | Kolk |
| 7,460,933 B2 | 12/2008 | Chapman, Jr. et al. |
| 7,621,140 B2 * | 11/2009 | Schnell et al. .................. 62/157 |
| 2005/0119766 A1 | 6/2005 | Amundson et al. |
| 2006/0192021 A1 | 8/2006 | Schultz et al. |
| 2009/0090115 A1 | 4/2009 | Boydstun et al. |
| 2009/0171862 A1 * | 7/2009 | Harrod et al. ................. 705/412 |

FOREIGN PATENT DOCUMENTS

| | | | |
|---|---|---|---|
| WO | WO2007/117245 | * | 10/2007 |

* cited by examiner

INDOOR AIR QUALITY CONTROLLERS AND USER INTERFACES

CROSS REFERENCE TO RELATED APPLICATIONS

This application claims priority from and the benefit of U.S. Provisional Application Ser. No. 61/097,133, entitled "CONTROLLER AND ASSOCIATED USER INTERFACE FOR CLIMATE CONDITIONING SYSTEM", filed Sep. 15, 2008, which is hereby incorporated by reference.

BACKGROUND

The invention relates generally to heating, ventilating, air conditioning, and refrigeration systems, and controllers for configuring these systems.

A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Residential systems generally include an indoor unit, such as an air handler or a furnace, and an outdoor unit, such as a heat pump or an air conditioner. A system controller, such as a thermostat, may be connected to control circuits within the indoor and outdoor units to control operation of the HVAC system. A user may adjust operating parameters of the HVAC system, such as the temperature of a heated or cooled space, through a user interface. However, in certain applications, the user interface may not allow for adjustment of more complex parameters. Further, a user may not understand how to adjust all but the simplest system parameters or how the components of the HVAC system function together.

SUMMARY

The present invention relates to a method that includes receiving weather forecast data, adjusting an operating parameter of a heating, ventilating, air conditioning, or cooling system based on the weather forecast data, and operating the heating, ventilating, air conditioning, or cooling system based on the adjusted operating parameter.

The present invention also relates to a method that includes receiving air quality data, adjusting an operating parameter of a heating, ventilating, air conditioning, or cooling system based on the air quality data, and operating the heating, ventilating, air conditioning, or cooling system based on the adjusted operating parameter.

The present invention further relates to a control device that includes a communication interface suitable for operable connection to an air treatment device that directs an air treatment substance into conditioned air of a heating, ventilating, air conditioning, or cooling system. The control device also includes a display capable of displaying one or more selectable graphical elements defining operating parameters for the air treatment device, a graphical user interface comprising the selectable graphical elements and capable of receiving a user input that selects one or more operating parameters for the air treatment device via the selectable graphical elements, and a processor capable of controlling operation of the air treatment device based on the selected operating parameters and capable of operating the heating, ventilating, air conditioning, or cooling system.

The present invention further relates to an air treatment device for a heating, ventilating, air conditioning, or cooling system. The air treatment device includes an enclosure for receiving a removable cartridge of an air treatment substance, a communication interface suitable for operable connection to a controller of the heating, ventilating, air conditioning, or cooling system, and a dispenser for expelling the air treatment substance from the cartridge in response to receiving a signal from the controller.

DRAWINGS

Figure 5:
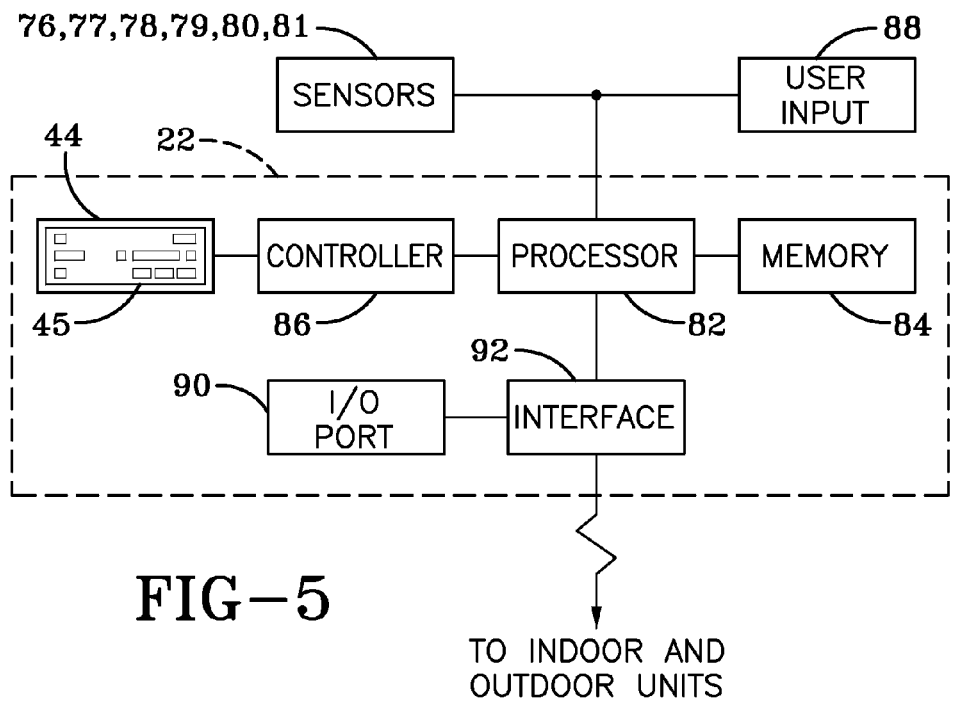
FIG. 5 is a block diagram of an embodiment of a system controller.
Figure 7:
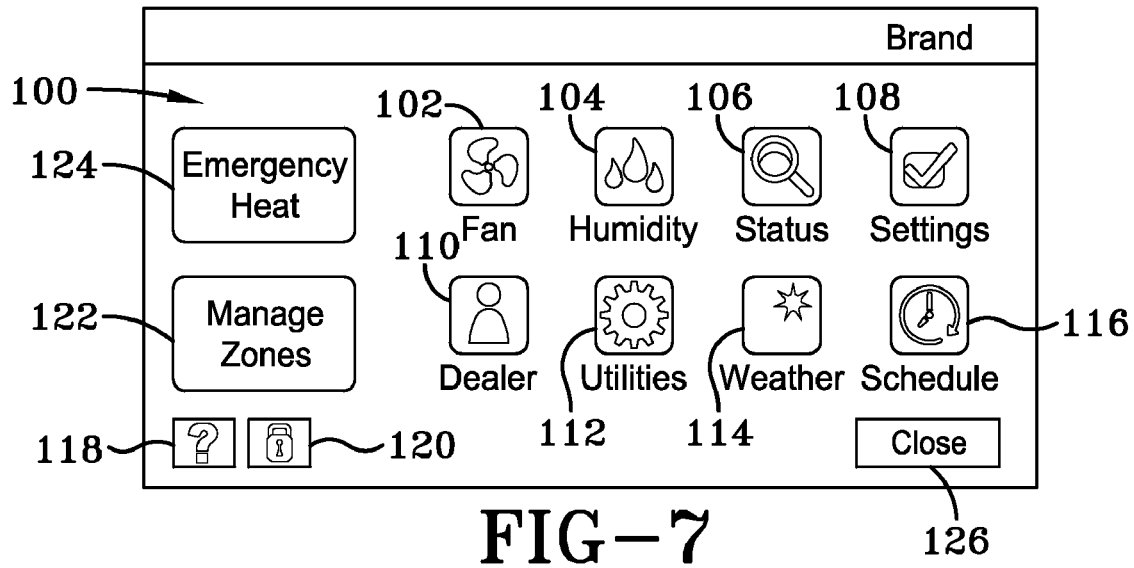

FIG. 7 a view of a menu screen of the controller of FIG. 5.

Figure 8:
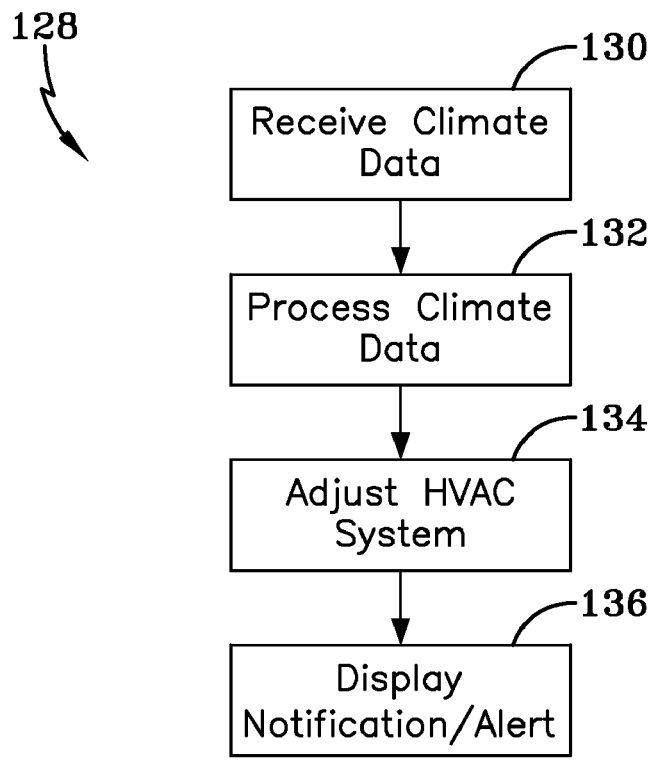

FIG. 8 is a flowchart depicting a method for adjusting an HVAC system based on climate data.

Figure 9:
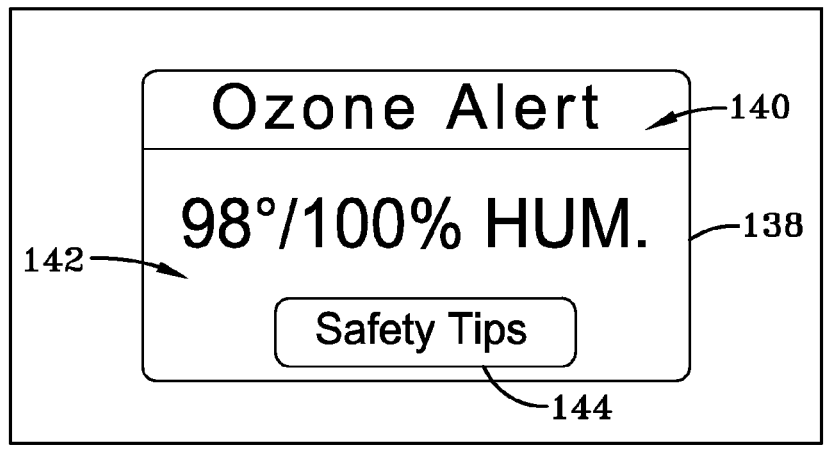

FIG. 9 is a view of a screen of the controller of FIG. 5 depicting a weather notification.

Figure 10:
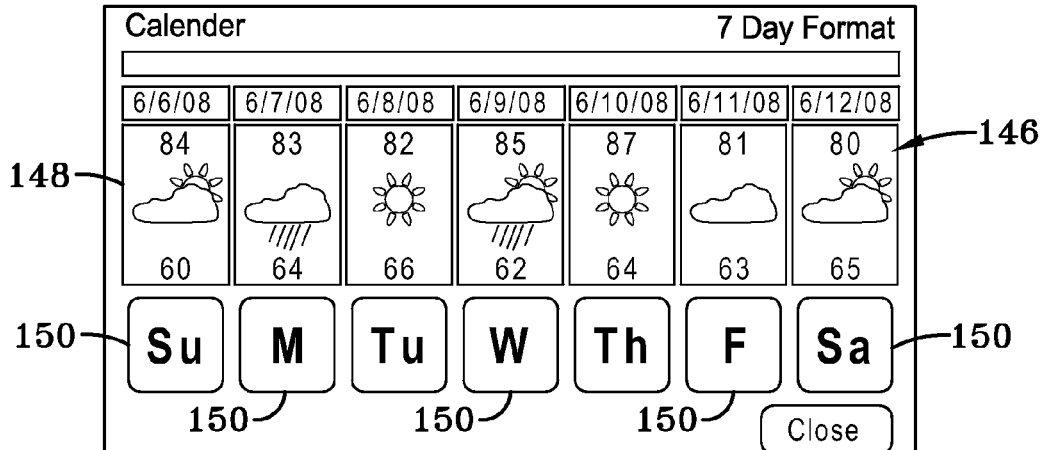

FIG. 10 is a view of a screen of the controller of FIG. 5 that may display weather information.

Figure 11:
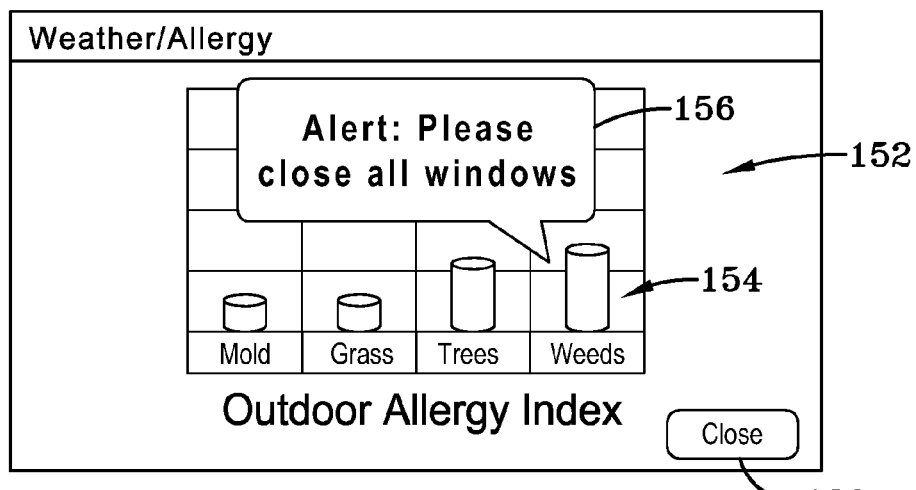

FIG. 11 is a view of another screen of the controller of FIG. 5 that may display weather information.

Figure 12:
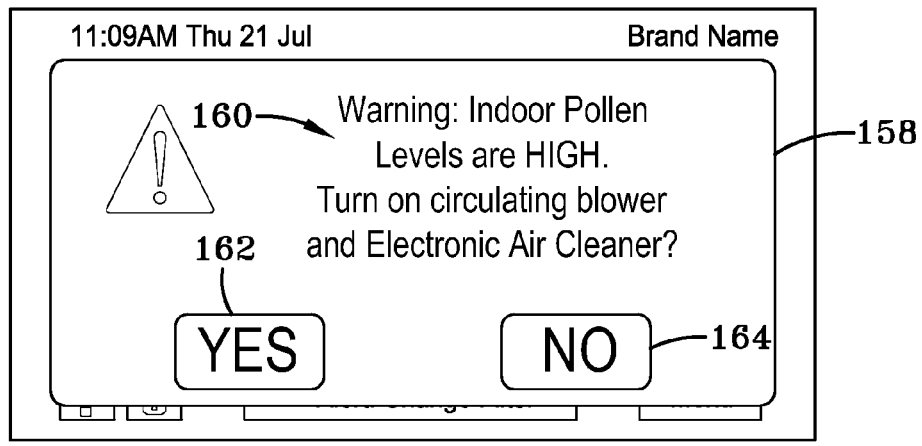

FIG. 12 is a view of a screen of the controller of FIG. 5 depicting a weather notification.

Figure 13:
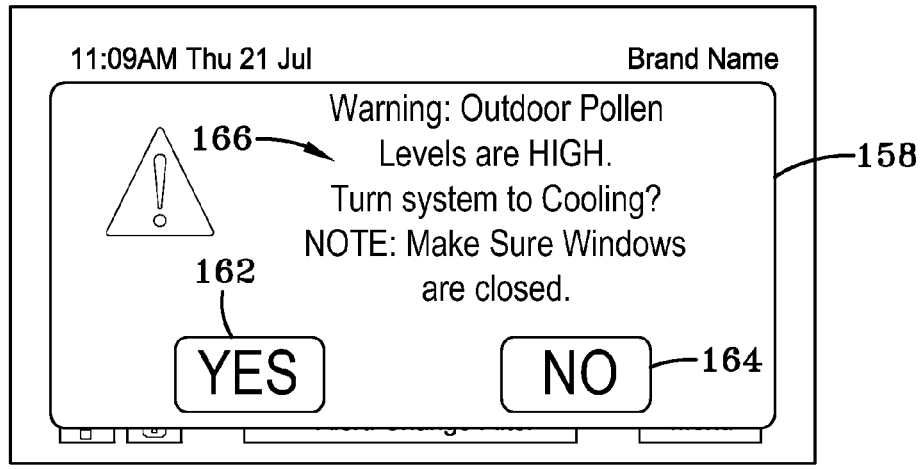

FIG. 13 is a view of another screen of the controller of FIG. 5 depicting a weather notification.

Figure 14:
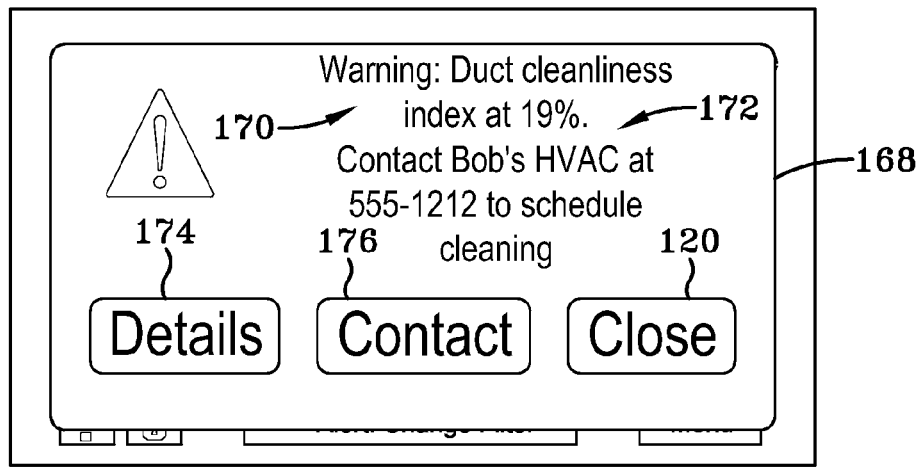

FIG. 14 is a view of a screen of the controller of FIG. 5 that may display duct cleanliness information.

Figure 15:
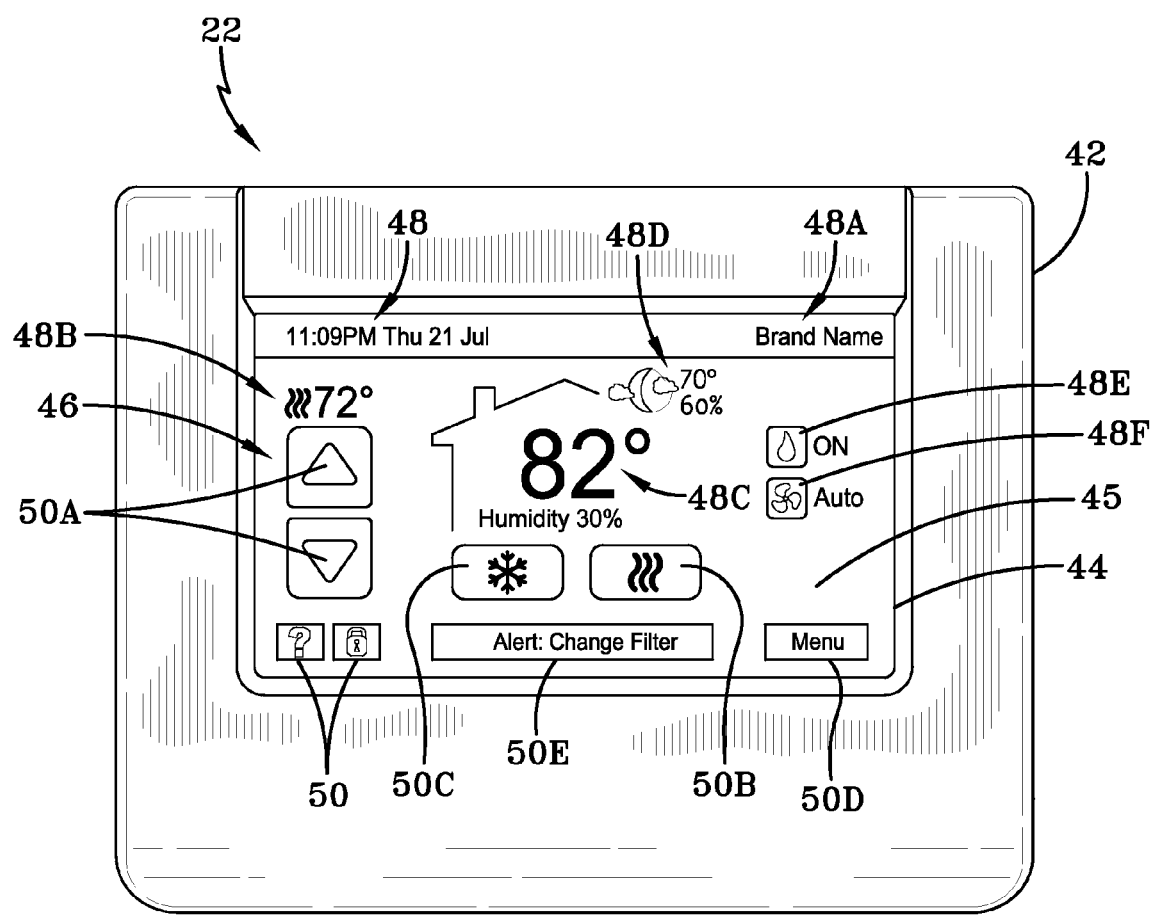

FIG. 15 is a view of a screen of the controller of FIG. 5 that may display lunar information.

Figure 16:
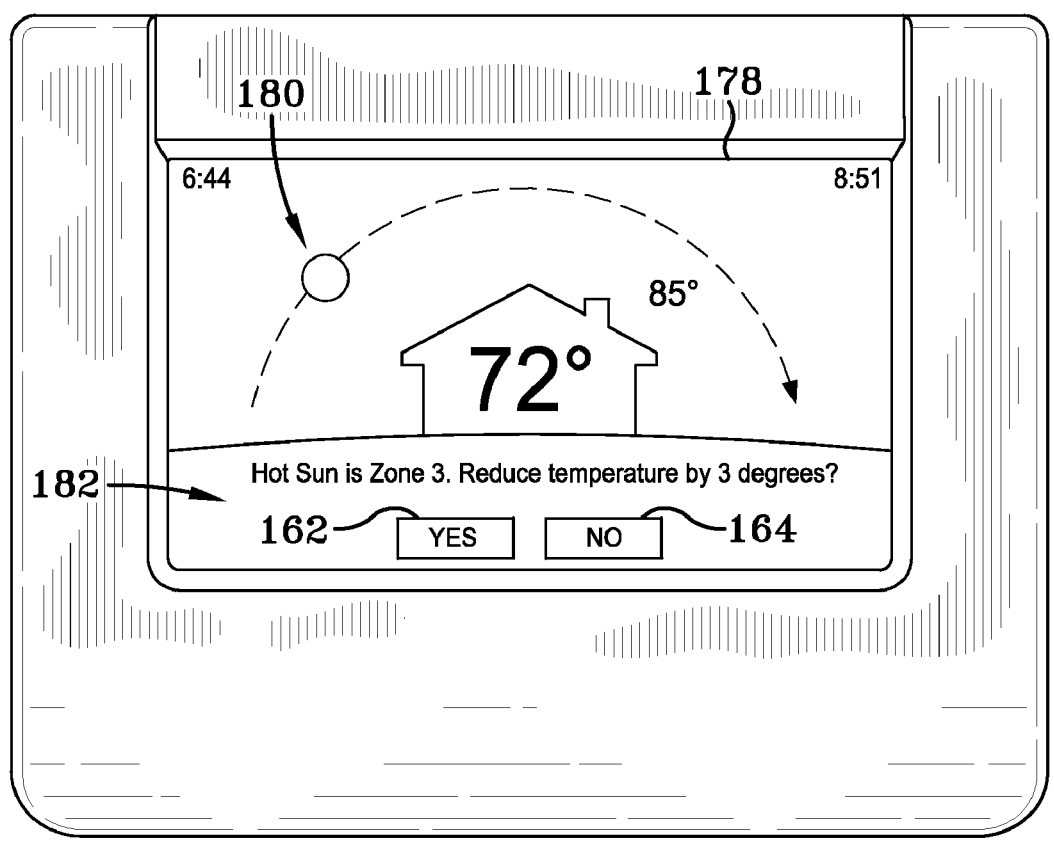

FIG. 16 is a view of another screen of the controller of FIG. 5 that may display lunar information.

Figure 4:
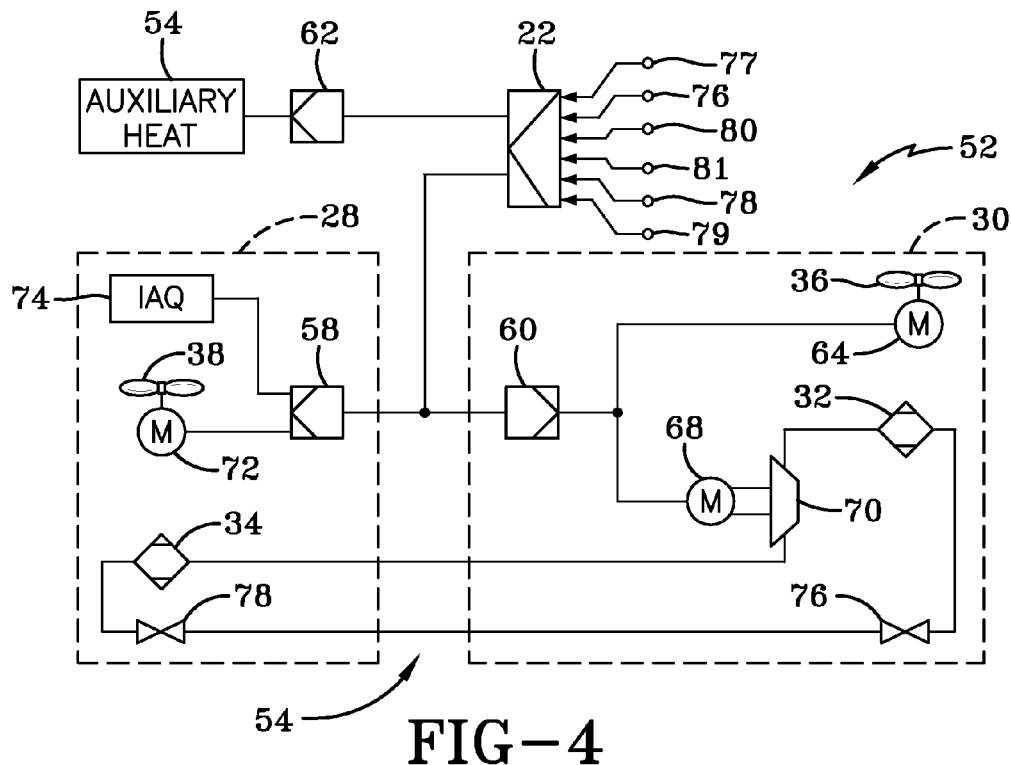
FIG. 4 is a block diagram of an embodiment of an HVAC system that employs a system controller.
Figure 17:
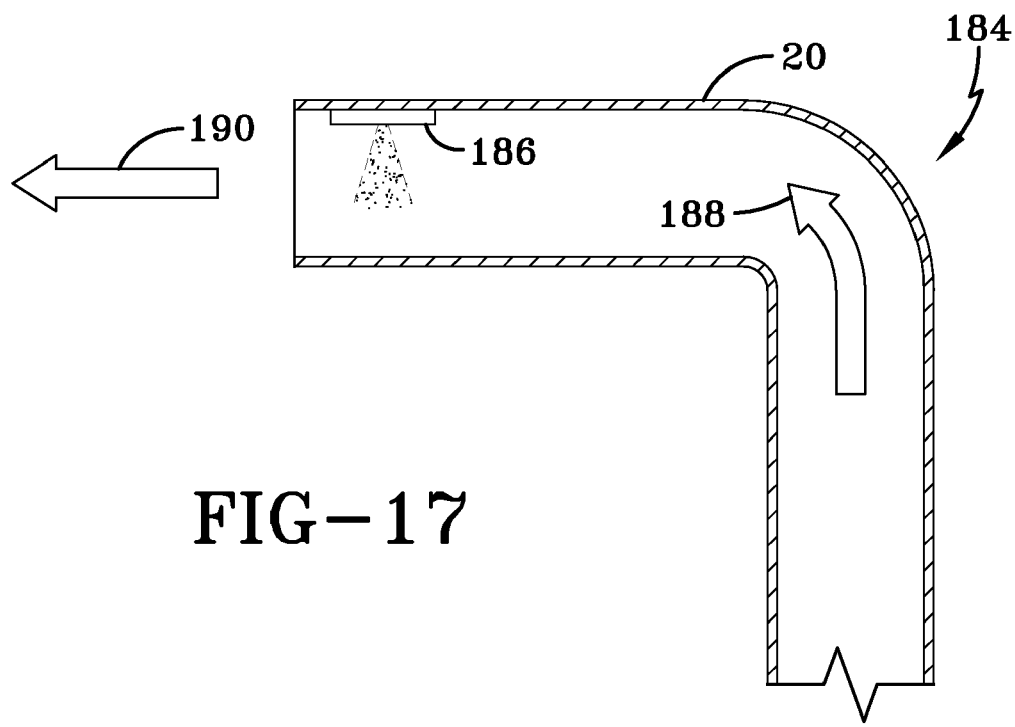

FIG. 17 is a schematic view of a portion of the HVAC system of FIG. 4 depicting an air treatment device.

Figure 18:
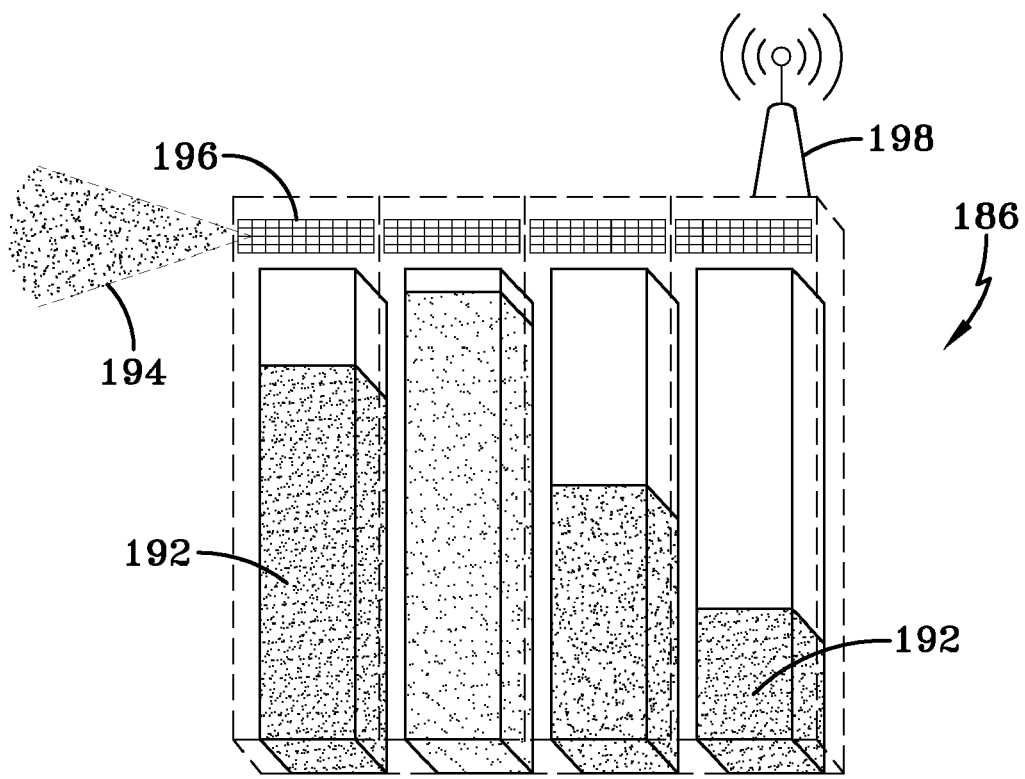

FIG. 18 is a schematic view of the air treatment device of FIG. 17.

Figure 19:
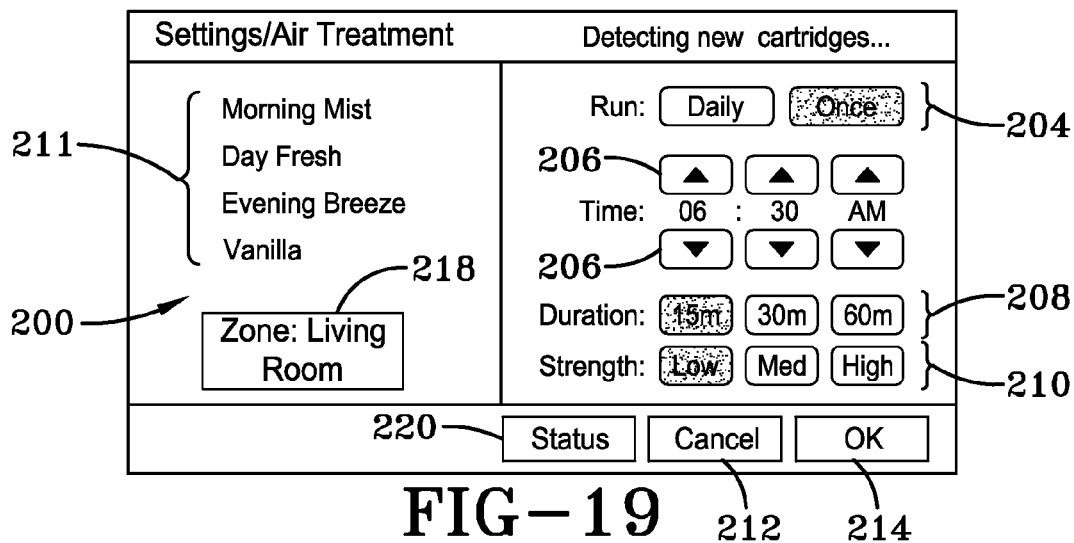

FIG. 19 is a view of a screen of the controller of FIG. 5 displaying information for the air treatment device of FIG. 18.

Figure 20:
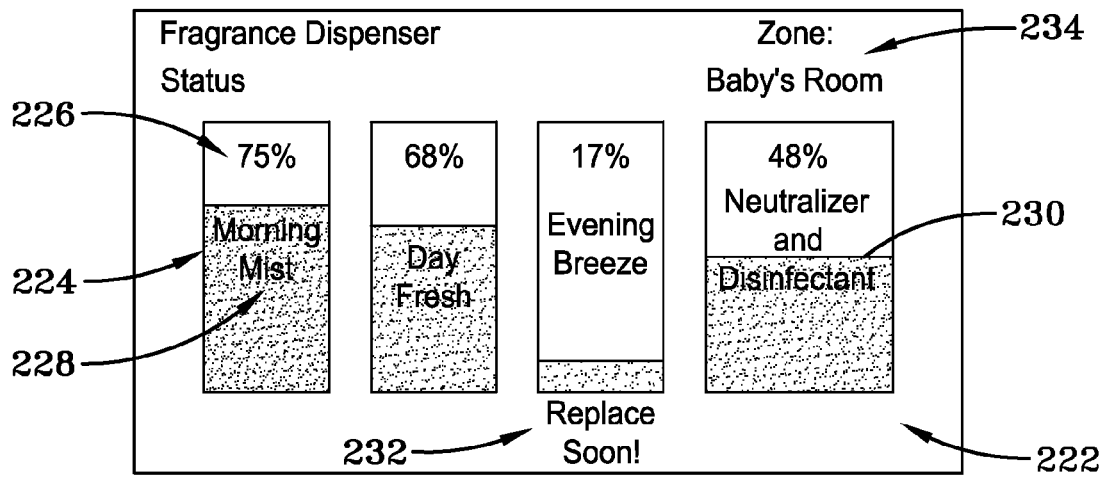

FIG. 20 is a view of another screen of the controller of FIG. 5 displaying information for the air treatment device of FIG. 18.

Figure 21:
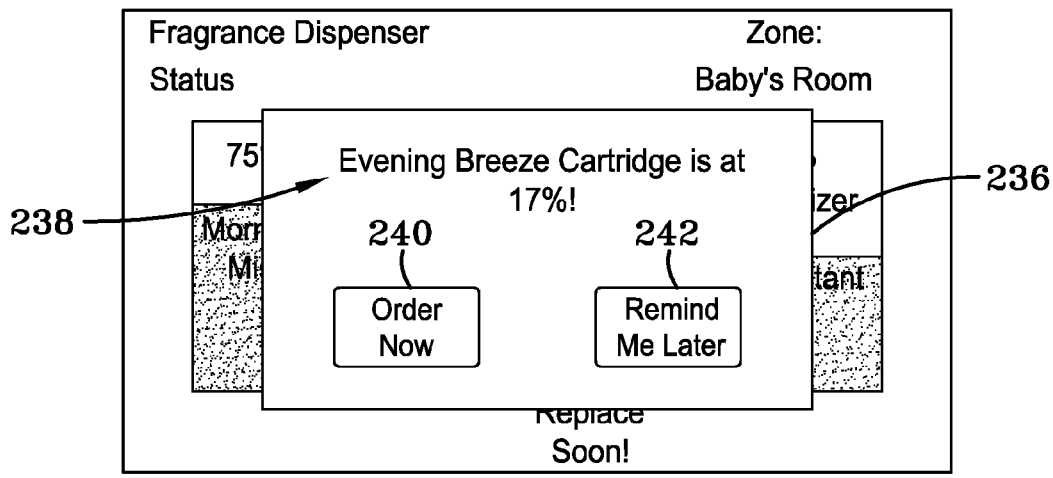

FIG. 21 is a view of another screen of the controller of FIG. 5 displaying information for the air treatment device of FIG. 18.

DETAILED DESCRIPTION

The present disclosure is directed to controllers that may use climate data to govern operation of the HVAC system. In general, HVAC systems may include temperature sensors that measure the indoor and/or outdoor temperatures. The temperatures measured by the sensors may then be used by the controller to govern operation of the HVAC system. In addition to measured temperatures, the presently disclosed controllers may use climate data, such as weather forecast information, air quality indicators, and the like, to govern operation of HVAC systems. According to certain embodiments, the controllers may include a communication interface for receiving climate data through a wide area network (WAN), local area network (LAN), personal area network (PAN), a really simple syndication (RSS) feed, a short message service (SMS), or a radio broadcast, among others. The controllers may adjust operating parameters of the HVAC system, such as operation of an electronic air cleaner or an air treatment device, based on the climate data. Further, in certain embodiments, the controllers may include a graphical user interface for displaying information related to the climate data.

Figure 1:
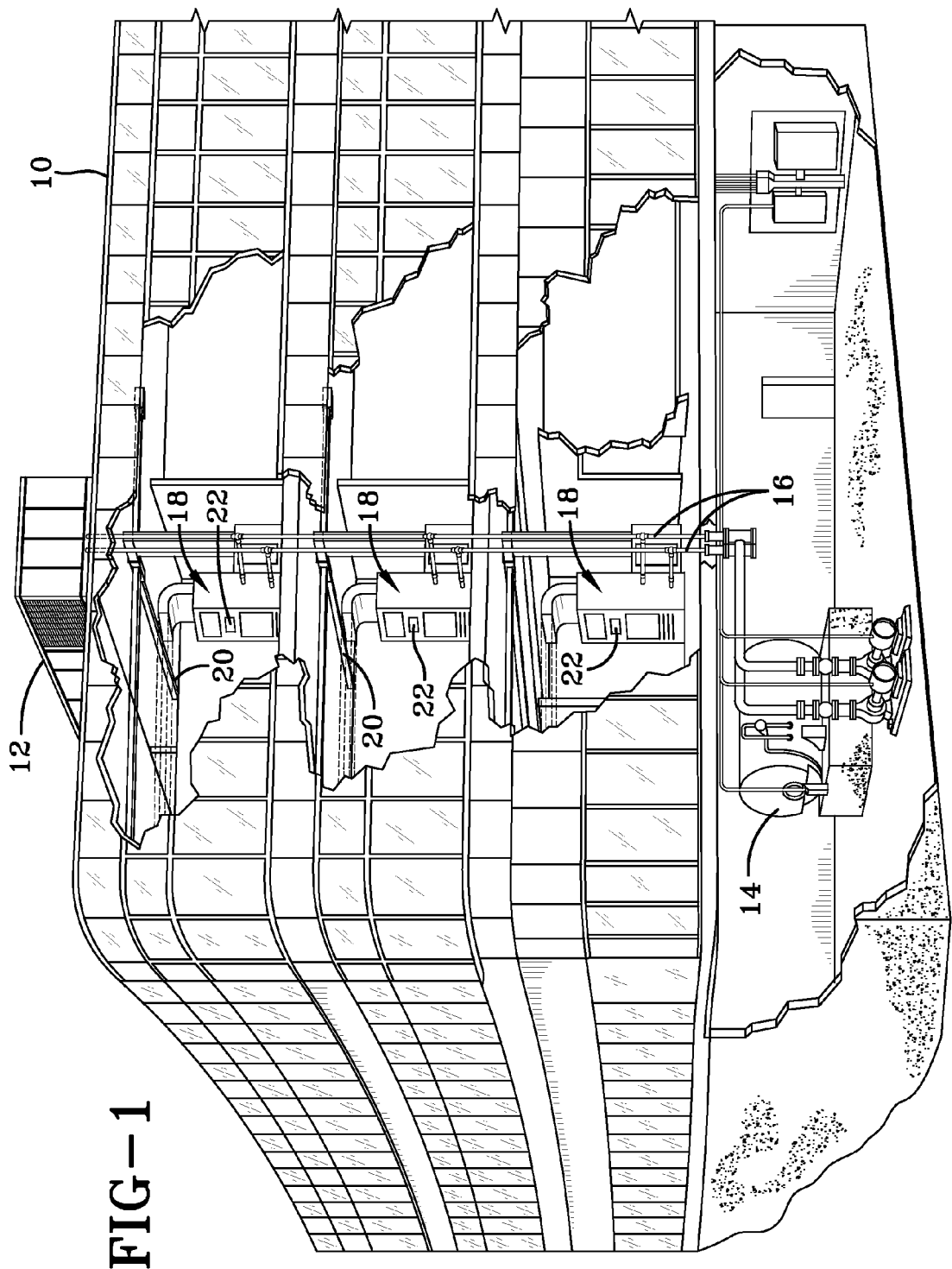
FIG. 1 is a perspective view of an embodiment of a commercial or industrial HVAC system that employs system controllers with user interfaces.

FIG. 1 illustrates an exemplary application, in this case an HVAC system for building environmental management, that may employ one or more system controllers with user interfaces. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A controller 22, shown here as including a thermostat, may be used to designate the temperature of the conditioned air. Controller 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
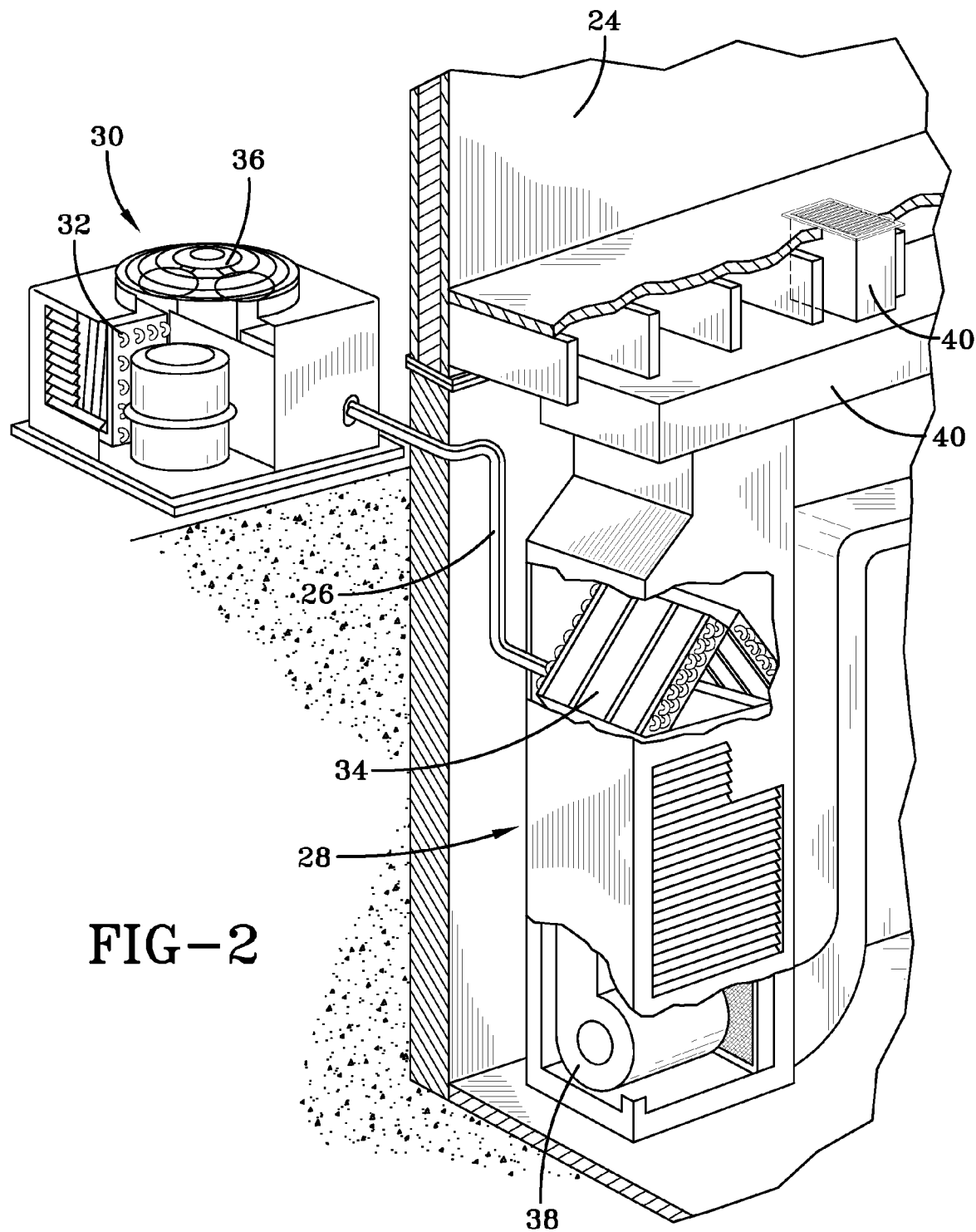
FIG. 2 is a perspective view of an embodiment of a residential HVAC system that employs system controllers with user interfaces.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 may include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a heat exchanger 32 in outdoor unit 30 serves as a condenser for re-condensing vaporized refrigerant flowing from indoor unit 28 to outdoor unit 30 via one of the refrigerant conduits 26. In these applications, a heat exchanger 34 of the indoor unit functions as an evaporator. Specifically, heat exchanger 34 receives liquid refrigerant (which may be expanded by an expansion device, not shown) and evaporates the refrigerant before returning it to outdoor unit 30.

Outdoor unit 30 draws environmental air through heat exchanger 32 using a fan 36 and expels the air above the outdoor unit. When operating as an air conditioner, the air is heated by heat exchanger 32 within outdoor unit 30 and exits the unit at a temperature higher than it entered. Indoor unit 28 includes a blower or fan 38 that directs air through indoor heat exchanger 34, where the air is cooled when the system is operating in air conditioning mode, and then circulates the air through ductwork 40 that directs the air to the residence 24. The overall system operates to maintain a desired temperature as set by a system controller 22 (FIG. 1). When the temperature sensed inside the residence is higher than the set point on the thermostat (plus a small amount), the air conditioner may become operative to refrigerate additional air for circulation through the residence. When the temperature reaches the set point (minus a small amount), the unit may stop the refrigeration cycle temporarily.

When the unit in FIG. 2 operates as a heat pump, the roles of heat exchangers 32 and 34 are reversed. That is, heat exchanger 32 of outdoor unit 30 will serve as an evaporator to evaporate refrigerant and thereby cool air entering outdoor unit 30 as the air passes over outdoor heat exchanger 32. Indoor heat exchanger 34 will receive a stream of air blown over it and will heat the air by condensing the refrigerant.

Figure 3:
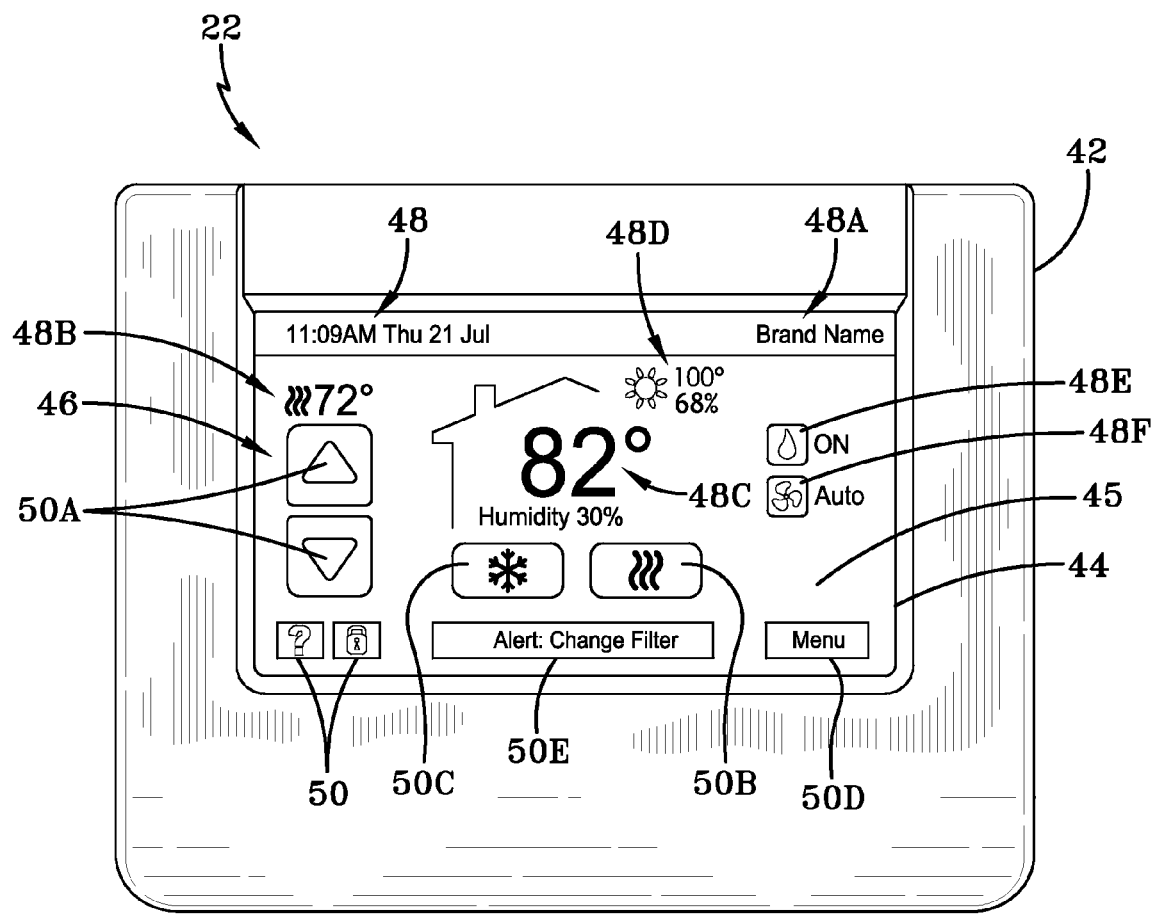
FIG. 3 is a perspective view of an embodiment of a system controller for an HVAC system.

FIG. 3 is a front view of controller 22, shown here as including a digital programmable thermostat. In other embodiments, the controller may be any suitable temperature controller. The controller 22 may be used to control one or more indoor and/or outdoor units. Controller 22 is protected by an enclosure 42 that protects the interior components from physical damage and shields them from environmental hazards such as dust and electromagnetic interference. The enclosure may be formed from any suitable material such as plastic, metal, or a composite material. A display 44 is mounted within enclosure 42 and may be used to display various images and text generated by the device. The display may be any type of display such as a liquid crystal display, a light emitting diode display, an organic light emitting diode display, or other suitable display and may be capable of displaying text strings and/or high-resolution color graphics. Additionally, the display includes a touch-sensitive element, such as a touch screen 45.

Touch screen 45 may receive input from a user's or object's touch and may send the information to a processor within the controller 22, which may interpret the touch event and perform a corresponding action. According to certain embodiments, the touch screen may employ resistive touch screen technology. However, in other embodiments, the touch screen may employ any suitable type of touch screen technology, such as capacitive, infrared, surface acoustic wave, electromagnetic, or near field imaging. Furthermore, touch screen 45 may employ single point or multipoint sensing.

Display 44 may be used to display a graphical user interface (GUI) 46 that allows a user to interact with the controller. GUI 46 may include various layers, windows, screens, templates, elements, or other components that may be displayed in all, or a portion, of display 44. Generally, GUI 46 may include textual and graphical elements that represent applications and functions of controller 22. For example, user GUI 46 may include status indicators 48 that display the status of the system and/or the environment. For example, an indicator 48B may display the operational mode (i.e., heating or cooling) and the temperature set point, an indicator 48C may display the current temperature and humidity, and an indicator 48D may display the weather conditions, among others. In another example, indicators 40E and 40F may display the humidity control status and the fan speed, respectively. In certain embodiments, the status indicators 48 also may include one or more brand indicators 48A that display information identifying the brand of controller 22.

GUI 46 also may include graphical elements 50 that may represent icons, buttons, sliders, menu bars, and the like. Graphical elements 50 may be selected by a user through the touch screen. For example, graphical elements 50A may be selected to increase or decrease the temperature set point. In another example, graphical elements 50B and 50C may be selected to change the system mode between heating and cooling. A graphical element 50D also may be selected by a user to display screens with menus and/or submenus for adjusting system settings and/or operation parameters of the HVAC system. Further, a graphical element 50E may notify a user that maintenance is required and may be selected to obtain maintenance information. As may be appreciated, the types and functionality of the graphical elements may vary depending on system functionality, system settings, and system equipment, among others. Further, in certain embodiments, controller 22 may include physical inputs, such as buttons, wheels, knobs, or the like, for receiving user input instead of, in addition to, or in combination with graphical elements 50.

FIG. 4 is a block diagram of an HVAC system 52 that includes controller 22, indoor unit 28 functioning as an air handler, and outdoor unit 30 functioning as a heat pump. Refrigerant flows through system 52 within a closed refrigeration loop 54 between outdoor unit 30 and indoor unit 28. The refrigerant may be any fluid that absorbs and extracts heat. For example, the refrigerant may be hydrofluorocarbon (HFC) based R-410A, R-407C, or R-134a. HVAC system 52 also includes an auxiliary heat system 56 that may be used to provide additional heating. For example, auxiliary heat system 56 may include a gas furnace, a fossil fuel furnace, an electric heat system, or the like.

The operation of indoor and outdoor units 28 and 30 is controlled by control circuits 58 and 60, respectively. Further, the operation of auxiliary heat system 56 is controlled by a control circuit 62. Control circuits 58, 60, and 62 may execute hardware or software control algorithms to govern operations of HVAC system 52. According to certain embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications. Further, in certain embodiments, the control circuits may be controlled through a wireless network.

Control circuits 58, 60, and 62 may receive control signals from controller 22 and transmit the signals to equipment located within indoor unit 28, outdoor unit 30, and auxiliary heat system 54. For example, outdoor control circuit 60 may route control signals to a motor 64 that powers fan 66 and to a motor 68 that powers a compressor 70. Indoor control circuit 58 may route control signals to a motor 72 that powers fan 38. Indoor control circuit 58 also may route control circuits to equipment included within an Indoor Air Quality (IAQ) system 74. For example, IAQ system 74 may include one or more air cleaners, UV air purifiers, humidifiers, and/or ventilators, among others. Further, IAQ system 74 may include an air treatment device that dispenses a mist or spray of fragrance, disinfectant, neutralizer, or the like into the conditioned air. The control circuits also may transmit control signals to other types of equipment such as valves 76 and 78, sensors, and switches.

Controller 22 may operate to control the overall heating and cooling provided by indoor unit 28, outdoor unit 30, and auxiliary heat system 54. Indoor and outdoor units 28 and 30 include heat exchangers 34 and 32 that function either as an evaporator or a condenser depending on the heat pump operation mode. For example, when HVAC system 52 is operating in cooling (or "AC") mode, outside heat exchanger 32 functions as a condenser, releasing heat to the outside air, while inside heat exchanger 34 functions as an evaporator, absorbing heat from the inside air. When HVAC system 52 is operating in heating mode, outside heat exchanger 32 functions as an evaporator, absorbing heat from the outside air, while inside heat exchanger 34 functions as a condenser, releasing heat to the inside air. A reversing valve (not shown) may be positioned on closed loop 54 to control the direction of refrigerant flow and thereby to switch the heat pump between heating mode and cooling mode.

HVAC system 52 also includes two metering devices 76 and 78 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when HVAC system 52 is operating in cooling mode, refrigerant bypasses metering device 76 and flows through metering device 78 before entering inside heat exchanger 34, which acts as an evaporator. In another example, when HVAC system 52 is operating in heating mode, refrigerant bypasses metering device 78 and flows through metering device 76 before entering outside heat exchanger 32, which acts as an evaporator. According to other exemplary embodiments, a single metering device may be used for both heating mode and cooling mode.

The refrigerant enters the evaporator, which is outside heat exchanger 32 in heating mode and inside heat exchanger 34 in cooling mode, as a low temperature and pressure liquid. Some vapor refrigerant also may be present as a result of the expansion process that occurs in metering devices 76 and 78. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 70. Compressor 70 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 70, the increased temperature and pressure vapor refrigerant flows into a condenser, the location of which is determined by the heat pump mode. In cooling mode, the refrigerant flows into outside heat exchanger 32 (acting as a condenser). Fan 36, which is powered by motor 64, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside heat exchanger 34 (acting as a condenser). Fan 38, which is powered by motor 72, draws air across the tubes containing refrigerant vapor. The heat from the refrigerant is transferred to the inside air causing the refrigerant to condense into a liquid.

After exiting the condenser, the refrigerant flows through the metering device (76 in heating mode and 78 in cooling mode) and returns to the evaporator (outside heat exchanger 32 in heating mode and inside heat exchanger 34 in cooling mode) where the process begins again.

In both heating and cooling modes, motor 68 drives compressor 70 and circulates refrigerant through reversible refrigeration/heating loop 54. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 68 is controlled by control circuit 60. Control circuit 46 may receive control signals from controller 22. In certain embodiments, controller 22 may receive information from a sensor 76 that measures the ambient indoor air temperature and a sensor 78 that measures indoor humidity. Controller 22 then compares the air temperature to the temperature set point (which may be input by a user) and engages compressor motor 68 and fan motors 64 and 72 to run the cooling system if the air temperature is above the temperature set point. In heating mode, controller 22 compares the air temperature from sensor 76 to the temperature set point and engages motors 64, 68, and 72 to run the heating system if the air temperature is below the temperature set point. According to certain embodiments, sensors 76 and 78 may be located within and/or may be an integral part of controller 22. However, in other embodiments, sensors 76 and 78 may be external devices connected to controller 22, for example, through a wired or wireless connection.

Control circuit 60 and controller 22 also may initiate a defrost cycle when the system is operating in heating mode. When the outdoor temperature approaches freezing, moisture in the outside air that is directed over outside heat exchanger 32 may condense and freeze on the coil. Controller 22 may receive information from one or more sensors 80 that measure the outside air temperature and, in certain embodiments, the temperature of outside heat exchanger 32. These sensors provide temperature information to the control circuit 60 which determines when to initiate a defrost cycle.

Controller 22 also may use temperature information from outdoor temperature sensor 80 to determine when to enable the auxiliary heating system 54. For example, if controller 22 receives a signal from temperature sensor 80 indicating that the outdoor temperature has dropped below a certain set point, controller 22 may disable operation of indoor unit 28 and outdoor unit 30 and enable auxiliary heating system 54. In certain embodiments, HVAC system 52 also may include a sensor 81 that senses the level of fuel within a fuel source for auxiliary heating system 54. For example, auxiliary heating system 54 may be a furnace that uses fuel from a propane tank. In this example, sensor 81 may measure the level of fuel within the propane tank and may provide this information to controller 22. Controller 22 may then determine when to operate auxiliary heating system 54, based at least in part on the fuel information provided by sensor 81. For example, if the fuel level is low, controller 22 may operate indoor and outdoor units 28 and 30 for heating, rather than operating auxiliary heating system 54. Further, in certain embodiments, depending on the outdoor temperature, among other factors, controller 22 may operate the auxiliary heating system 54 in conjunction with indoor unit 28 and outdoor unit 30.

Controller 22 also may determine when to operate IAQ system 74 and/or fans 36 and 38 based on information from air quality sensors 77 and 79. Sensors 77 may detect pollen and/or allergen levels and may be located inside the conditioned environment and/or outside. If controller 22 detects that outside pollen levels are high, controller 22 may discontinue operation of fan 36 or may close the ventilation system damper that allows outside air to enter the home. In another example, controller 22 may enable operation of an electronic air cleaner within IAQ system 74 if indoor allergen levels are high. Sensors 79 may detect duct cleanliness levels and be disposed in different areas within ductwork 20 (FIG. 1). In certain embodiments, controller 22 may discontinue operation of certain zones within HVAC system 52 in response to detecting low duct cleanliness levels. Sensors 79 may include any suitable sensor, such as a video camera with video frame analysis capability, a particulate sensor, or a sensor that detects changes in resistance as particulates are accumulated on the sensor, among others.

FIG. 5 is a simplified block diagram illustrating various components and features of controller 22 in accordance with one embodiment. The block diagram includes display 36 discussed above with respect to FIG. 3, as well as many other components. As noted above with respect to FIG. 4, the controller 22 may be used to control operation of an HVAC system with one or more indoor and outdoor units, such as indoor unit 28, outdoor unit 30, and auxiliary heating system 54. In certain embodiments, each of the units may include a control circuit communicatively coupled to the controller. However, in other embodiments, only some of the units may include control circuits, and the units without control circuits may be wired to and controlled by control circuits within the other units and/or by the controller. Further, the controller may be employed to control a system with only one unit. For example, an HVAC system may provide only heating using an indoor unit such as a furnace. No outdoor unit may be included and no refrigerant may be involved.

The operation of controller 22 may be controlled by a processor 82 that provides the processing capability for the controller. In certain embodiments, the processor 82 may include one or more microprocessors, instruction set processors, graphics processors, and/or related chip sets. Processor 82 may cooperate with a memory 84 that stores executable and/or machine-readable code, data, and instructions for processor 82. For example, the memory 84 may store look up tables and/or algorithms for GUI 46 (FIG. 3). Memory 84 also may store protocol information and instructions for allowing communication between controller 22 and connected units. The memory may include volatile memory such as random access memory and/or non-volatile memory such as read only memory, flash memory, a hard drive, or any other suitable optical, magnetic, or solid-state computer readable media, as well as a combination thereof.

Memory 72 also may store components of GUI 46 (FIG. 3), such as graphical elements, screens, and templates, that may be shown on display 44. A controller 86 may provide the infrastructure for exchanging data between processor 82 and display 44. According to certain embodiments, controller 86 may be an integrated circuit. Further, controller 86 may exist as a separate component or be integrated into display 44 or processor 82. According to exemplary embodiments, controller 86 may govern operation of display 44 and may process graphics and text for display on display 44. Further, controller 86 may process touch events received through the touch screen of display 44.

Display 44 may display screens of GUI 48 prompting a user to enter a user input 88 through touch screen 45. User input 88 may include a value specifying properties of the HVAC system. For example, a screen may prompt a user to select one of the graphical elements 50 to adjust a temperature set point or to determine the heating or cooling mode. In another example, display 44 may display setup screens prompting a user to input a schedule for the HVAC system.

User input 88 also may be received through an input/output (I/O) port 90. The I/O port may be a serial port, USB port, media card port, IEEE-1394 port, network interface, or other suitable interface configured to receive input from an external device. For example, the I/O port may be a USB port for connecting to a USB drive or flash drive. In certain embodiments, the I/O port may be a wireless interface for connecting to a computer, cell phone, or personal navigation device over a wireless network, such as an IEEE 802.11x wireless network. Moreover, in certain embodiments, screens of GUI 46 may be transmitted through I/O port 90 to an external device, such as a cell phone or computer, to facilitate control of controller 22 through the external device.

A communication interface 92 may transmit information received through I/O port 90 to processor 82. In certain embodiments, communication interface 92 may process data prior to transmitting the data to processor 82. Communication interface 92 also may provide an infrastructure for communicating information from I/O port 90 and processor 82 to the indoor and outdoor units 28, 30, 54, 74 (FIG. 4) within the HVAC system. In certain embodiments, the communication interface may be a serial communication interface including one or more protocols for transmitting and/or receiving communication packets containing control signals. For example, the communication interface may employ one or more protocols such as Modbus, BACnet, DNET, or PROFIBUS (Process Field Bus). In certain embodiments, the communication interface may include a Controller Area Network (CAN) chip for communicating with the indoor and outdoor units, with the auxiliary heating system, and/or with external devices. According to exemplary embodiments, communication interface 92 may employ packet switching to route communication packets to the indoor and outdoor units and to the auxiliary heating system. Further, in certain embodiments, communication interface 92 may communicate with external servers, devices, and/or systems. For example, communication interface 92 may connect through a network to a weather information provider to obtain weather forecast and/or real time information. According to certain embodiments, communication interface 92 may include a radio transmitter and/or receiver for receiving radio broadcasts. Communication interface 92 also may include a wide area network (WAN) interface, a personal area network (PAN) interface, a short message service (SMS) interface, a really simple syndication (RSS) interface, and/or an unstructured supplementary service data (USSD) interface, among others.

Figure 6:
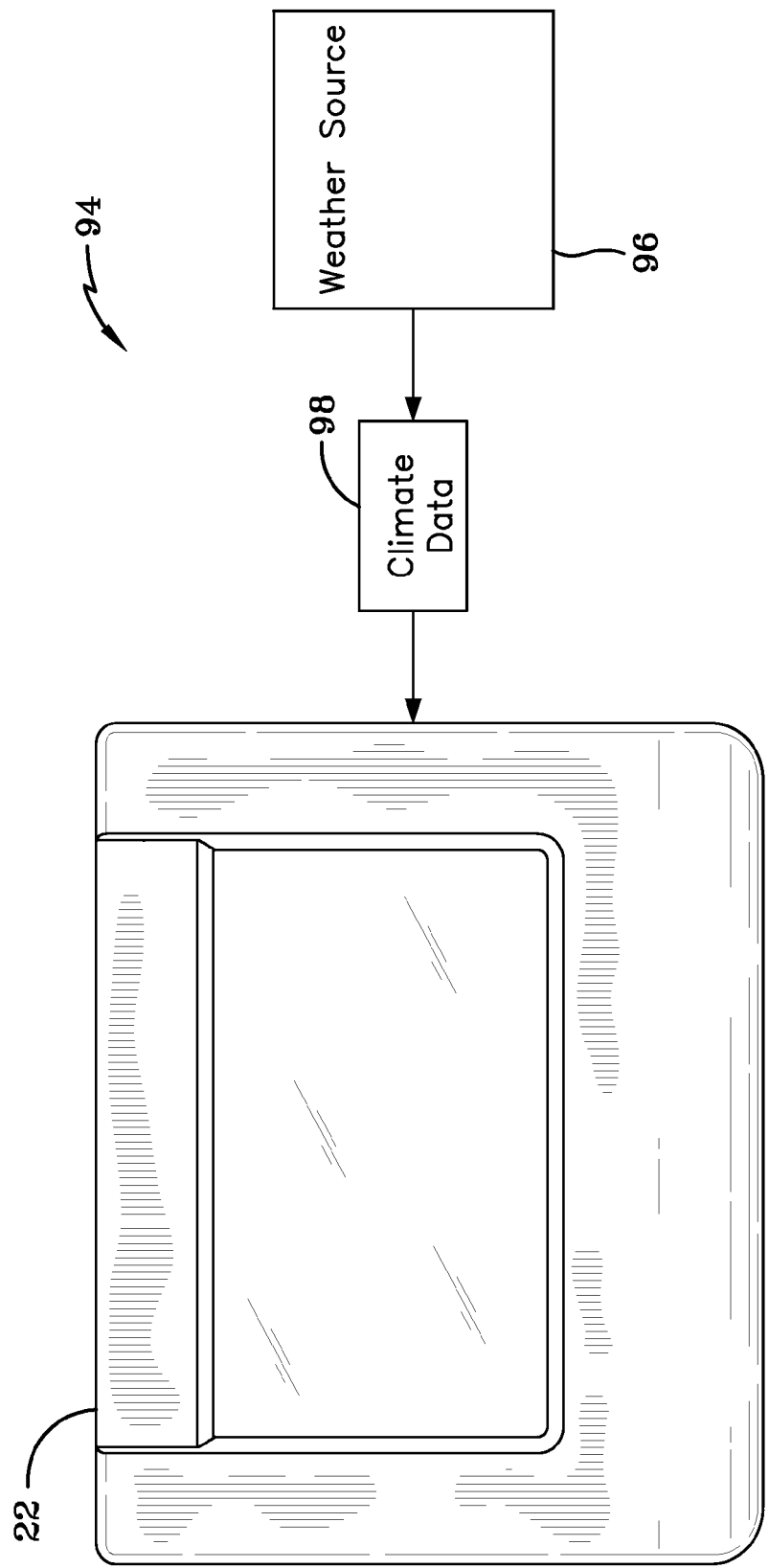
FIG. 6 is a schematic view of a system for receiving climate data.

FIG. 6 depicts a system 94 that includes controller 22 and a weather source 96. Specifically, controller 22 may receive climate data 98 from weather source 96 and may govern operation of HVAC system 52 based at least in part on the climate data 98. For example, live or predictive climate data may be used to adjust temperature set points, control indoor air quality, and display weather information on controller 22. Weather source 96 may include a server for a national weather source, such as the national oceanic and atmospheric administration (NOAA), a local weather information source, the Internet, a government weather agency, a non-governmental agency, a weather feed, such as the really simple syndication (RSS) feed, and/or localized weather information that may be measured by local devices employed by a user. Climate data 98 may include weather information, such as current weather conditions, forecasted weather conditions, precipitation levels, outdoor temperatures, barometric pressures, wind speed and/or direction, visibility conditions, or weather alerts, such as a severe thunderstorm watch or warning, an air quality warning, an ozone alert, or the like. Further, climate data 98 may also include road condition information, such as weather-related road conditions, construction-related road conditions, and like, as well as safety tips and emergency notifications, such as terror alerts, amber alerts, and evacuation notices. Further, in certain embodiments, weather source 96 may include a measurement device, such as a barometer or temperature sensor that is coupled to controller 22. For example, weather source may include sensors 77 or 79, as shown in FIG. 4.

Controller 22 may display information related to climate data 98, which may assist a user in adjusting settings through controller 22. For example, if a homeowner is leaving for vacation for a week and the weather forecast calls for unusually cold temperatures, controller 22 may display the temperature information and prompt the user to set the temperature set point a few degrees higher than if temperatures were in the normal range. The increased temperature set point may ensure that all areas of the home, including those farther away from controller 22 and/or farther away from the temperature sensor, may maintain a comfortable temperature, for example, to benefit plants or pets located in remote areas of the home.

Controller 22 may receive climate data 98 through communication interface 92 (FIG. 5). As described above with respect to FIG. 5, communication interface 92 may include a network interface, a radio transmitter and/or receiver, a messaging interface, or the like. For example, controller 22 may receive climate data 98 in the form of text messages, paging messages, a radio broadcast, and/or an XML RSS format. For example, NOAA may transmit an XML RSS feed containing a local weather report to controller 22. Further, in certain embodiments, weather source 96 also may transmit non-weather related alerts, such as a missing child alert.

FIG. 7 depicts a menu screen 100 of GUI 46 for viewing, changing, or initially entering settings of HVAC system 52. In certain embodiments, screen 100 may be displayed by selecting graphical element 50D from the home screen shown in FIG. 3. Screen 100 includes graphical elements 102, 104, 106, 108, 110, 112, 114, and 116 that may be selected by a user through touch screen 45 to display various screens and submenus of GUI 46 for adjusting settings, and/or operating parameters. For example, a user may select graphical element 114 to view climate data, such as the weather forecast, weather alerts, road conditions, and the like, received through controller 22. In another example, a user may select graphical element 108 to enter geographical location, such as a zip code, state, city, or county, that controller 22 may use to retrieve and/or process climate data corresponding to the designated geographical region. In yet another example, a user may select one of the graphical elements 102, 104, 106, 108, 110, 112, or 116 to display a menu for adjusting fan settings, humidity settings, general settings, dealer information, system utilities, or operating schedules.

Screen 104 also includes graphical elements 118 and 120 that may be selected to view other screens of GUI 46, such as a help screen and a password or PIN screen. A graphical element 122 may be selected to adjust settings for zones within HVAC system 52. For example, HVAC system 52 may include electrically controlled dampers that are independently controlled by controller 22 to adjust the airflow to different areas, or zones, within the building. The zones may allow HVAC system 52 to maintain different environmental conditions, such as temperature, humidity, or airflow, within different areas of the building. In certain embodiments, each zone may have a slave controller that communicates with controller 22. Further, in other embodiments, each zone may be controlled by controller 22 with each zone having separate temperature and/or humidity sensors. Moreover, in certain embodiments, each zone may have a separate air treatment device to allow customization of different fragrances, neutralizers, or other air treatments that may be added to the conditioned air. A graphical element 124 may be selected to enable emergency heating. For example, graphical element 124 may be selected to override current system settings and provide emergency heat using auxiliary heating system 54. Menu screen 104 also includes a graphical element 126 that may be selected to close the menu screen and return to the home screen shown in FIG. 3.

Based on climate data 98, controller 22 may adjust operation of HVAC system 52. FIG. 8 depicts a method 128 that may be employed to adjust settings for HVAC system 52 based on the climate data. The method 128 may begin by receiving (block 130) climate data. For example, controller 22 may receive climate data 98 from a weather source 96 through communication interface 92. As described above, climate data 98 may be received via a text message, paging message, radio broadcast, email, RSS feed, or other type of communication.

Controller 22 may then process (block 132) the climate data. For example, controller 22 may filter or parse the climate data to identify the relevant data based on user preferences stored within memory 84. The user preferences may specify the geographical location of controller 22 and/or may specify the types of climate data that may be used to govern operation of HVAC system 52. The user preferences may be set at the factory, may be set during installation, and/or may be adjusted by a homeowner.

Controller 22 may store location information identifying the geographical location of controller 22 within memory 84 (FIG. 5). For example, a user may enter the zip code, geographical coordinates, street, city, county, or state, among others, into controller 22 through GUI 46. Further, in certain embodiments, controller 22 may receive geographical information through communication interface 92, for example, through a personal navigation device. Moreover, one of the units 28, 30, or 54 may include a GPS receiver for determining the present location. Controller 22 may use the location information to process the climate data. In certain embodiments, controller 22 may employ look up tables and/or algorithms to parse the received information, for example, parsing an XML feed, text message, or the like, to identify the climate data that corresponds to the current geographical location. Further, controller 22 may scan weather alerts that are received to identify only those alerts applicable to the user's county.

In addition to, or instead of, using location information, controller 22 also may process the climate data using other types of user preferences, which may be stored in memory 84 (FIG. 5). For example, a user may enter preferences through GUI 46 that specify the type of climate data, such as a weather forecast or pollen forecast, the user wishes to receive. In another example, a user may select an option for alerting the user of a weather emergency. Further, a user may set preferences that enable, disable, or adjust operating parameters for HVAC system 52 based on the climate data. For example, a user may set threshold levels, such as an allergy threshold level or an air quality threshold, that when exceeded prompt action by controller 22. For example, when controller 22 receives climate data that indicates that the allergy threshold level has been exceeded, controller 22 may enable an electronic air cleaner and ultraviolet lamps.

After processing the climate data, controller 22 may adjust (block 134) operation of the HVAC system based on the climate data. Based on the climate data, controller 22 may adjust various operating parameters, such as fan speeds for the indoor and/or outdoor units, temperature set points, humidity set points, transition temperature set points for switching between a heat pump and an auxiliary heating system, defrost modes for the heat pump, heating or cooling modes (i.e. switching between high cool and low cool, or high heat and low heat), operation of a continuous fan, operation of an outside air ventilation damper, or operation of equipment within indoor air quality system 74, such as electronic air cleaners, ultraviolet lamps, or air treatment devices, among others. For example, controller 22 may adjust a temperature set point based on a weather forecast. If the weather forecast anticipates colder temperatures, controller 22 may increase the temperature set point by a certain amount, such as two degrees, in anticipation of the cold weather. In another example, if controller 22 receives an Air Quality Alert from NOAA, controller 22 may discontinue the use of outdoor air for ventilation.

Controller 22 may also monitor the weather forecast information and proactively and dynamically adjust system operation to anticipate changing weather conditions. For example, if controller 22 detects a high outdoor humidity level, controller 22 may increase operation of the dehumidifier to prevent the indoor humidity level from increasing. In another example, when the heat pump system is operating, controller 22 may employ a defrost algorithm that may be adjusted to optimize the defrost cycle based on outdoor anticipated weather conditions. For example, if controller 22 detects a humid condition with temperatures approaching freezing, the heat pump may implement a defrost cycle to reduce accumulation of frost on the outdoor evaporator coil. Further, controller 22 may adjust the timing and/or length of the defrost cycle based on predicted weather conditions. Predictive operation of HVAC system 52 may be designed to provide more consistent humidity levels, temperature levels, and/or air quality levels within the home. Further, predictive operation of HVAC system 52 may provide more efficient operation of the equipment within HVAC system 52 and/or more efficient operation of HVAC system 52 as a whole. In certain embodiments, controller 22 may determine that no adjustment of HVAC system 52 is required, an in these embodiments, step 134 may be omitted.

After adjusting the HVAC system, controller 22 may display (block 136) a notification and/or may emit an alert. For example, controller 22 may display a weather forecast on display 44 (FIG. 3). In another example, controller 22 may display a weather emergency alert. Further, controller 22 may emit an audible or visual signal to alert the user of the information that has been received. For example, in response to receiving a weather alert, controller 22 may emit an audible signal, for example, through a speaker included within controller 22. In another example, controller 22 may be tied into the homes lighting system and may flash lights of the home in response to receiving a weather alert. Further, controller 22 may display a request for user verification prior to adjusting operating parameters of HVAC system 52. For example, controller 22 may display a request prompting a user to verify adjustment of a temperature set point or to verify switching to a continuous fan mode.

FIG. 9 depicts a window 138 that may be displayed by controller 22 to alert a user of weather and/or emergency information. Window 138 includes information 140 describing the type of alert. For example, as shown, information 140 displays an ozone alert. In other examples, the information may include safety tips, such as "stay indoors" during a thunderstorm watch, or "seek shelter" during a tornado warning. Further, in another example, information 140 may include instructions to "apply sunscreen before going outside" during an ozone alert. Window 138 also may include information 142 describing the current weather conditions, such as the temperature, humidity, barometric pressure, precipitation levels, cloud cover, or the like. In certain embodiments, information 142 may be related to the weather alert. For example, during a thunderstorm warning, information 142 may include the precipitation level or the type of rain and/or wind expected. Window 138 also may include a graphical element 144 that a user may select to view safety tips. For example, during a tornado warning, a user may select graphical element 144 to receive recommendations for seeking shelter.

FIG. 10 depicts a screen 146 that may be displayed on controller 22 to communicate weather information to a user. For example, screen 146 includes a weather forecast 148. Graphical elements 150 representing days of the week may be displayed below the weather forecast. In certain embodiments, a user may select a graphical element 150 to adjust operating parameters, such as temperature set points, humidity set points, or the like, for each day of the week based on the displayed weather forecast 148.

FIG. 11 depicts a screen 152 that may be displayed to communicate air quality information to a user. Screen 152 includes a graph 154 of allergen and/or pollen information. However, in other embodiments graph 154 may be replaced by a calendar, trend, chart, or the like. The allergen and/or pollen information may be received from sensors 77 (FIG. 4) or from an external system, such as a weather server, through communication interface 92 (FIG. 5). Based on the allergen or pollen information, controller 22 may adjust operation of IAQ system 74 (FIG. 4) to regulate air quality within the home. IAQ system 74 may include devices that are designed to condition air to reduce pollen, particulate, and/or allergen levels within the home. For example, the devices may include media type filters, electronic air filters, electronic air cleaners, and ultraviolet lights (UV lights), for example. In response to detecting high allergen levels, controller 22 may enable or increase operation of the devices within IAQ system 74. Further, controller 22 may display screen 152 to notify the user of the current allergen levels.

Screen 152 may also include a window 146 that provides corrective actions that a user may take based on the allergy or pollen information. For example, alert 156 may direct a user to close the windows. In another example, alert 156 may recommend running a continuous fan with UV lights and an electronic air cleaner when the mold spore level is high. In certain embodiments, alerts may be displayed when pollen or allergen index levels are above a threshold stored within memory 84. For example, a user may select the types of allergens and/or the levels that may trigger alerts and/or corrective actions by controller 22. For example, controller 22 may automatically take corrective action, such as turning on an electronic air cleaner when allergen levels are detected above a predetermined threshold.

FIGS. 12 and 13 depict examples of screens that may be displayed based on pollen and/or allergen levels. FIG. 12 depicts a window 148 with information 160 that may be displayed to alert the user of high pollen levels. For example, controller 22 may receive information from sensors 77 (FIG. 4) that indicates that indoor pollen levels are high. Further, in other embodiments, controller 22 may estimate indoor pollen levels using look up tables and/or algorithms in conjunction with climate data received through communication interface 92 (FIG. 5). Information 160 also may include a suggested action that a homeowner may take in response to the high pollen levels. For example, information 160 may suggest turning on a fan and an electronic air cleaner within IAQ system 74. Graphical elements 162 and 164 may be selected by a user to confirm or reject the suggested action.

FIG. 13 depicts another alert 166 that may be displayed based on outdoor pollen levels. For example, controller 22 may detect high outdoor pollen levels based on information received from sensors 77 and/or based on climate data 98 received through communication interface 92. Alert 166 may suggest a corrective action, such as placing HVAC system 52 in a cooling mode. Alert 166 also may prompt a user to close windows before implementing cooling. A user may select graphical elements 162 and 164 to confirm or reject the suggested action.

FIG. 14 depicts an embodiment of controller 22 that may be used to monitor air cleanliness levels within a home. For example, controller 22 may receive air cleanliness information through sensors 79 (FIG. 4). As described above with respect to FIG. 4, Sensors 79 may include one or more sensors disposed within ductwork of HVAC system 52. Sensors may transmit cleanliness information, for example, by measuring particulate levels, to controller 22. Controller 22 may then process the levels for example, by comparing the levels to predetermined settings stored within memory 84. In certain embodiments, controller 22 may monitor trend information and/or individual data points. Further, information from multiple sensors may be combined to generate a duct cleanliness index representing the cleanliness of the entire HVAC system.

As shown in FIG. 14, controller 22 may display a window 168 with information 170 describing the duct cleanliness levels. For example, window 168 may be displayed with information 170 alerting the user of the current duct cleanliness level. Dealer information 172 also may be used that a homeowner may employ to contact the dealer to schedule a cleaning period. Window 168 also may include graphical elements 174 and 176 that may be selected to view additional information. Specifically, graphical element 174 may be selected to view additional duct cleanliness details. For example, controller 22 may display one or more screens showing the duct cleanliness for each zone within HVAC system 52. Further, in certain embodiments, sensors 79 (FIG. 4) may include a particulate sensor, a video camera with video frame analysis capability, or a sensor that has a changing value, such as resistance as it accumulates dirt or dust. Sensors 79 may communicate its raw data to controller 22 via communication interface 92. Further, in certain embodiments, sensors 79 may process the data and provide a cleanliness index to controller 22.

FIGS. 15 and 16 depict an embodiment of controller 22 that may display of lunar and solar information through GUI 46. As shown in FIG. 15, controller 22 may be used to display lunar phase information. For example, indicator 48D may include a graphical element depicting the lunar phase, such as whether the moon is full, three quarters full, or a new moon. In certain embodiments, indicator 48D may display a lunar graphic during the nighttime as shown in FIG. 15 and a solar graphic during the daytime as shown in FIG. 3.

FIG. 16 depicts a window 178 that may be used to show the position of the sun and moon with respect to the residence. Window 178 may include a graphical representation 180 of the sun and/or moon that shows the position of the sun and/or moon in the sky. For example, controller 22 may determine the approximate position of the sun or moon using predefined equations and/or algorithms that characterize the sun and moon orbits for the particular location. In certain embodiments, the sun and moon positions may be calculated based on the location information stored within memory 84 (FIG. 5). Further, based on the solar and lunar information, controller 22 may adjust the color of the background to reflect the time of day. For example, a dark colored background may be displayed at night while a light colored background may be displayed during the day.

Controller 22 also may apply control logic to adjust operation of HVAC system 52 based on the solar or lunar conditions. Controller 22 may detect the location of the sun and how it affects certain zones within the HVAC system. For example, controller 22 may detect that hot sun is currently hitting zone three of HVAC system 52. Controller 22 may then display a suggestion 182 that recommends reducing the cooling set point for that zone. The suggestions 182 may facilitate user adjustment of operating conditions within each zone based on solar or lunar information. For example, controller 22 may prompt a user to deliver more cooling to a west facing zone when the sun is on the west side of a home. Further, in certain embodiments, controller 22 may automatically adjust operating parameters of HVAC system 52 based on lunar and/or solar conditions. For example, in response to detecting hot sun on a specific zone, controller 22 may automatically deliver more cooling to that zone.

FIGS. 17-21 depict use of controller 22 to control the application of fragrances or other air treatments to the air being distributed to the home by HVAC system 52. FIG. 17 depicts a portion 184 of HVAC system 52 that includes an air treatment device 186. For example, air treatment device 186 may be mounted within ductwork 20 (FIG. 2) of the home. In certain embodiments, air treatment devices 186 may be mounted within ductwork corresponding to each zone of HVAC system 52. Air 188 may move through ductwork 20 and may flow by or through air treatment device 186. As air 188 flows past air treatment device 186, device 186 may dispense the air treatment substance into the air to deliver treated air 190 into the living space. In other embodiments, air treatment device 186 may be mounted in any desired location.

FIG. 18 is a schematic diagram of air treatment device 186. Air treatment device 186 includes removable cartridges 192 that may dispense fragrances or other treatments into the air. Cartridges 192 may be designed to dispense fragrances, odor neutralizers, disinfectants, or the like. Further, cartridges 192 may dispense the air treatment substances into the air in the form of a mist or spray 194 that may be delivered through a nozzle 196. Air treatment device 186 may control the amount of air treatment substance that is dispensed. For example, device 186 may include a microprocessor and/or control circuitry that may be used to determine when to dispense the air treatment and how much treatment substance to dispense. Further, air treatment device 186 may include a communication interface 198, such as a wired or wireless communication interface, that communications with controller 22 through communication interface 92.

Air treatment device 186 may communicate information to controller 22 describing the types of air treatment cartridges installed. For example, device 186 may communicate the type of air treatment substance within each air cartridge, the number of air cartridges installed, the location of air treatment device 186, and the amount of air treatment substance remaining in each cartridge. Further, device 186 may transmit fault or malfunction information to controller 22 through communication interface 198. In certain embodiments, device 186 may be powered by batteries or may be connected to the home's power supply.

As shown in FIG. 19, a user may control the application of air treatments through GUI 46. A screen 200 may be displayed on controller 22 to allow a user to adjust settings of the air treatment device. Screen 200 may include graphical elements 204 that may be selected to adjust the frequency of the air treatments. For example, a user may set controller 22 to dispense air treatments daily, or in a single application. Further, graphical elements 206 may be selected to adjust the time of the air treatment. Moreover, graphical elements 208 may be selected to adjust the duration of the air treatment, and graphical elements 210 may be selected to adjust the relative strength of the air treatment. Screen 200 also may include a graphical element 211 that enables a user to select the type of air treatment that is applied. For example, graphical elements 211 may describe the type of air treatment substance included within each cartridge installed within air treatment device 186. Screen also includes a graphical element 218 that describes the location of air treatment device 186. Further, in certain embodiments, controller 22 also may include control logic that uses data from room occupancy sensors and building automation devices to ensure that controller 22 dispenses certain air treatments only when occupants are not present or when doors to that area are locked. After customizing the application of air treatment substances through graphical elements 204, 208, 210, and 11, a user may select graphical elements 212 and 214 to okay the adjusted settings or to cancel the changes.

Screen 200 also includes a graphical element 220 that may be selected by a user to view the status of the air treatment device as depicted in FIG. 20. In response to selection of graphical element 220, controller 22 may display a screen 222 that describes the status of the air treatment device. Screen 222 may include status indicators 224 that display status information 226 and 228 describing the state of each cartridge within device 186. For example, status indicator 226 may display the amount of air treatment substance remaining in each cartridge. Indicator 228 may display the type of air treatment substance that is located within each cartridge. Status indicators 224 also may display a level or a fill line 230 that graphically represents the amount of air treatment substance remaining within each cartridge. Controller 22 may receive this information through communication interface 92, which may connect to the communication interface 198 of air treatment device 186. In response to detecting that a cartridge is low, controller 22 may display a notification 232 to alert the user to replace the cartridge. Further, in certain embodiments, the notification 232 may be displayed as a popup window over a main screen of controller 22. Screen 222 also may include a zone indicator 234 that identifies the zone of the currently selected air treatment device 186.

As depicted in FIG. 21, GUI 46 also may facilitate ordering of air treatment substances. For example, when controller 22 detects that a cartridge is low, controller 22 may display a window 236 on controller 22. Window 236 may include an alert 238 that notifies the user that a cartridge is low. Graphical elements 240 and 242 may be selected by a user to order additional product or to setup an additional reminder. For example, in response to selection of graphical element 240, controller 22 may display ordering information for the desired cartridge. In another embodiment, in response to selection of graphical element 240, controller 22 may send a refill request to a dealer or supplier of the air treatment cartridge. The request may be sent through communication interface 92. Further, in response to selection of graphical element 242, controller 22 may display a screen that allows the user to setup a reminder that may be displayed at a later date or time. In certain embodiments, a user may add the reminder to a calendar of thermostat 22 and controller 22 may then download the reminder to a user's personal calendar through communication interface 92.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method comprising a control device performing the following steps:
   receiving weather forecast data;
   adjusting, via a processor of the control device, an operating parameter of a heating, ventilating, air conditioning, or cooling system based on the weather forecast data, wherein adjusting an operating parameter comprises adjusting a defrost cycle for a heat pump; and
   operating the heating, ventilating, air conditioning, or cooling system based on the adjusted operating parameter.

2. The method of claim 1, wherein receiving weather forecast data comprises receiving weather forecast data through a network communication interface.

3. The method of claim 1, wherein receiving weather forecast data comprises receiving a really simple syndication (RSS) feed.

4. The method of claim 1, comprising adjusting a temperature set point of the heating, ventilating, air conditioning, or cooling system based on the weather forecast data.

5. The method of claim 1, comprising processing the weather forecast data to identify the weather forecast data that corresponds to a specified geographical location.

6. The method of claim 1, comprising displaying the weather forecast data.

7. The method of claim 1, wherein adjusting a defrost cycle comprises adjusting a timing of the defrost cycle or a duration of the defrost cycle, or both.

8. The method of claim 1, wherein adjusting a defrost cycle comprises initiating the defrost cycle in response to receiving the weather forecast data, wherein the weather forecast data comprises a humid condition and a freezing temperature.

9. A method comprising a control device performing the following steps:
   receiving weather forecast data;
   adjusting, via a processor of the control device, an operating parameter of a heating, ventilating, air conditioning, or cooling system based on the weather forecast data, wherein adjusting an operating parameter comprises adjusting a transition temperature for switching between a heat pump and a furnace; and
   operating the heating, ventilating, air conditioning, or cooling system based on the adjusted operating parameter.

10. The method of claim 9, wherein receiving weather forecast data comprises receiving weather forecast data through a really simple syndication (RSS) feed.

11. The method of claim 9, wherein receiving weather forecast data comprises receiving weather forecast data through a network communication interface.

12. The method of claim 9, comprising adjusting a temperature set point of the heating, ventilating, air conditioning, or cooling system based on the weather forecast data.

13. The method of claim 9, comprising processing the weather forecast data to identify the weather forecast data that corresponds to a specified geographical location.

14. The method of claim 9, comprising displaying the weather forecast data.

15. A control device comprising:
   means for receiving weather forecast data;
   means for adjusting an operating parameter of a heating, ventilating, air conditioning, or cooling system based on the weather forecast data, wherein the operating parameter comprises a defrost cycle for a heat pump; and
   means for operating the heating, ventilating, air conditioning, or cooling system based on the adjusted operating parameter.

16. The control device of claim 15, wherein the means for receiving weather forecast data comprises a really simple syndication (RSS) communication interface.

17. The control device of claim 15, wherein the means for receiving weather forecast data comprises a network communication interface.

18. The control device of claim 15, comprising a memory, wherein the means for adjusting an operating parameter comprises a processor configured to execute code stored within the memory.

19. The control device of claim 18, wherein the processor is configured to process the weather forecast data to identify the weather forecast data that corresponds to a specified geographical location.

20. The control device of claim 15, comprising a display configured to display the weather forecast data.

21. A control device comprising:
   means for receiving weather forecast data;
   means for adjusting an operating parameter of a heating, ventilating, air conditioning, or cooling system based on the weather forecast data, wherein the operating parameter comprises a transition temperature for switching between a heat pump and a furnace; and
   means for operating the heating, ventilating, air conditioning, or cooling system based on the adjusted operating parameter.

22. The control device of claim 21, wherein the means for receiving weather forecast data comprises a really simple syndication (RSS) communication interface.

23. The control device of claim 21, wherein the means for receiving weather forecast data comprises a network communication interface.

24. The control device of claim 21, comprising a memory, wherein the means for adjusting an operating parameter comprises a processor configured to execute code stored within the memory.

* * * * *